United States Patent
Alonso Fernandez et al.

(10) Patent No.: US 11,035,737 B2
(45) Date of Patent: Jun. 15, 2021

(54) METHOD AND SYSTEM FOR CHARACTERIZATION AND COMPRESSION OF ULTRASHORT PULSES

(71) Applicants: SPHERE ULTRAFAST PHOTONICS SL, Boiro (ES); UNIVERSIDAD DE SALAMANCA, Salamanca (ES)

(72) Inventors: Benjamin Alonso Fernandez, Zamora (ES); Inigo Juan Sola Larranaga, Salamanca (ES); Helder Manuel Paiva Rebelo Cerejo Crespo, Matosinhos (PT)

(73) Assignees: SPHERE ULTRAFAST PHOTONICS SL, Boiro (ES); UNIVERSIDAD DE SALAMANCA, Salamanca (ES)

( * ) Notice: Subject to any disclaimer, the term of this patent is extended or adjusted under 35 U.S.C. 154(b) by 0 days.

(21) Appl. No.: 16/615,179

(22) PCT Filed: Jun. 26, 2018

(86) PCT No.: PCT/IB2018/054700
§ 371 (c)(1),
(2) Date: Nov. 20, 2019

(87) PCT Pub. No.: WO2019/003102
PCT Pub. Date: Jan. 3, 2019

(65) Prior Publication Data
US 2020/0173860 A1 Jun. 4, 2020

(30) Foreign Application Priority Data
Jun. 26, 2017 (PT) .......................... 110166

(51) Int. Cl.
*G01J 11/00* (2006.01)
*G02F 1/35* (2006.01)

(52) U.S. Cl.
CPC ............ *G01J 11/00* (2013.01); *G02F 1/3501* (2013.01); *G02F 1/3503* (2021.01); *G02F 2203/26* (2013.01); *G02F 2203/50* (2013.01)

(58) Field of Classification Search
None
See application file for complete search history.

(56) References Cited

U.S. PATENT DOCUMENTS 5,689,361 A * 11/1997 Damen ................. H01S 3/0057
359/284
6,025,911 A * 2/2000 Diddams .................. G01J 11/00
356/450

(Continued)

FOREIGN PATENT DOCUMENTS

| EP | 3062075 A1 | 8/2016 |
|---|---|---|
| WO | 2013054292 A1 | 4/2013 |
| WO | 2016125002 A1 | 8/2016 |

OTHER PUBLICATIONS

Loriot et al.; "Self-referenced characterization of femtosecond laser pulses by chirp scan", Optics Express, 2013, vol. 21, No. 21, pp. 24879-24893.

(Continued)

*Primary Examiner* — Shawn Decenzo
(74) *Attorney, Agent, or Firm* — Lucas & Mercanti, LLP (57) ABSTRACT

The present application relates to a method and system for characterization and compression of ultrashort pulses. It is described a flexible self-calibrating dispersion-scan technique and respective system to characterize and compress ultrashort laser pulses over a broad range of pulse parameters, where previous knowledge of the amount of dispersion introduced for each position or step of the compressor is not required. The self-calibrating d-scan operation is based on the numerical retrieval of the spectral phase of the pulses using an optimization algorithm, where the spectral (Continued)

phase is treated as a multi-parameter unknown variable, and where the unknown dispersion of the dispersion scanning system is described by a theoretical model of its functional dependence on the compressor position.

17 Claims, 5 Drawing Sheets

(56) References Cited

U.S. PATENT DOCUMENTS

| | | |
|---|---|---|
| 9,397,463 B2* | 7/2016 | Da Costa Ribeiro De Miranda ............... H01S 3/0092 |
| 2014/0321486 A1* | 10/2014 | Da Costa Ribeiro De Miranda ............... H01S 3/0057 372/21 |

OTHER PUBLICATIONS

Miranda et al.,"Simultaneous compression and characterization of ultrashort laser pulses using chirped mirrors and glass wedges", Optics Express, 2012, vol. 20, No. 1, pp. 638-697.
Miranda et al.,"Characterization of broadband few-cycle laser pulses with the d-scan technique", Optics Express, 2012, vol. 20, No. 17, pp. 18732-18743.
International Search Report and Written Opinion for Corresponding International Application No. PCT/IB2018/054700 (17 Pages) (dated Nov. 7, 2018).

* cited by examiner

METHOD AND SYSTEM FOR CHARACTERIZATION AND COMPRESSION OF ULTRASHORT PULSES

CROSS-REFERENCE TO RELATED APPLICATIONS

This application is a 371 of PCT/IB2018/054700 filed Jun. 26, 2018, which claims the benefit of Portuguese Patent Application No. 110166 filed Jun. 26, 2017, both applications are incorporated herein by reference.

TECHNICAL FIELD

The present application relates to a method and system for the simultaneous compression and characterization of ultrashort laser pulses.

BACKGROUND ART

Since the advent of ultrashort laser pulses, the community of users has been working in the development of methods to measure such short events, most of them based on nonlinear effects involving the pulse itself or a comparable ultrashort pulse. Some of these methods are well-established and present many variants [1]. A key goal in most ultrashort pulse measurement techniques is obtaining the spectral phase of the pulse, which together with the spectrum fully determines the temporal shape and duration of the pulse. A related method to the disclosed method is the recently introduced dispersion-scan (d-scan) technique [2,3], which originally consisted in the measurement of the sum-frequency generation (SFG) and second-harmonic generation (SHG) signals produced by a pulse in a nonlinear medium for different and well-known values of dispersion introduced by a chirped mirror and glass wedge compressor around the maximum compression point. The resulting measurement, known as the d-scan trace, contains encoded information about the spectral phase of the pulse. By coupling this measurement with a suitable mathematical model and optimization algorithm, one is able to fully retrieve the spectral phase of the pulse from the d-scan trace, without the need of approximations. The d-scan technique has several advantages, including a simple and robust experimental setup devoid of temporal delay lines, beam splitting or beam recombination, and relaxed SFG and SHG conversion bandwidth requirements compared to other techniques. It is highly robust to noise and can even correctly retrieve the phase when there is no SHG signal for a given frequency, as long as there is SFG signal generated by mixing that frequency with other parts of the pulse spectrum. Additionally, a dispersion-scan setup also doubles as a pulse compressor, which together with its measurement capability allows one to simultaneously measure and optimize the compression of the pulse. Until now, the variable dispersion has mostly been introduced with glass wedges of known material and angle. By controlling the steps of the wedge insertion, the amount of glass crossed by the pulse is easily determined and its dispersion (to arbitrary order) can be obtained from the corresponding refractive index calculated, e.g., with Sellmeier equations. This information is used within the optimization algorithm that calculates the spectral phase of the pulse, expressed as a multi-parameter unknown variable. This implementation and approach has enabled, e.g., the generation and measurement of sub-two-cycle [4] and even near-single-cycle [5] amplified laser pulses post-compressed in a hollow-core fiber (HCF), but there is also strong interest in measuring longer pulses like those directly produced by Ti:Sapphire chirped pulse amplification (CPA) laser systems and optical parametric CPA (OPCPA) systems, since this is determinant in many applications such as materials processing, ultrafast spectroscopy, hollow-core fiber (HCF) post-compression, multi-plate continuum (MPC) post-compression, high-harmonic generation and laser particle acceleration experiments, among others. However, the narrower bandwidth of these pulses makes it not practical to introduce enough dispersion with glass wedges of any angle and material to obtain an adequate d-scan trace. The pulse compressors used in ultrafast CPA systems are normally based in diffraction gratings, prisms, grisms or a combination thereof, which are capable of introducing much larger dispersion than glass wedges and are designed to compress the output pulses of the specific laser system they are part of, providing optimized dispersion and minimum pulse duration for a specific position of the compressor. However, these compressors are usually not calibrated, and the exact amount of dispersion (to arbitrary order) introduced for a given position or step of the compressor is not known nor required for their operation. The following references should be considered herewith incorporated in their entirety:

[1] I. A. Walmsley and C. Dorrer, Adv. Opt. Photon. 1, 308 (2009);
[2] M. Miranda, T. Fordell, C. Arnold, A. L'Huillier, and H. Crespo, Opt. Express 20, 688 (2012);
[3] M. Miranda, T. Fordell, C. Arnold, F. Silva, B. Alonso, R. Weigand, A. L'Huillier, and H. Crespo, Opt. Express 20, 18732 (2012);
[4] B. Alonso, M. Miranda, F. Silva, V. Pervak, J. Rauschenberger, J. San Román, I. J. Sola, and H. Crespo, Appl. Phys. B 112, 105 (2013);
[5] F. Silva, M. Miranda, B. Alonso, J. Rauschenberger, V. Pervak, and H. Crespo, Opt. Express 22, 10181 (2014);
[6] V. Loriot, G. Gitzinger, and N. Forget, Opt. Express 21, 24879 (2013);
[7] P. Wnuk, H. Fuest, M. Neuhaus, L. Loetscher, S. Zherebtsov, E. Riedle, Zs. Major, and M. F. Kling, Opt. Express 24, 18551-18558 (2016);
[8] M. Miranda, F. Silva, A. L'Huillier, and C. L. Arnold, in Conference on Lasers and Electro-Optics, OSA Technical Digest (2016) (Optical Society of America, 2016), paper JTu5A.67;
[9] G. D. Reid and K. Wynne. Ultrafast laser technology and spectroscopy. In Encyclopedia of Analytical Chemistry (ed. Meyers, R. A.) 13644 (John Wiley & Sons, Ltd., Chichester, 2000);
[10] Patent application WO 2013054292A1;
[11] Patent application WO 2016125002A1.

SUMMARY

The present application describes a method for characterizing the spectral phase of a laser pulse, comprising the following steps:
- applying spectral phases to the pulse by applying known or unknown amounts of dispersion so as to scan a dispersion range;
- applying a nonlinear optical process to the pulse;
- for each of the applied spectral phases, measuring the optical power spectrum of the nonlinear signal resulting from the preceding step;
- calculating the spectral phase of the pulse to be characterized and the applied dispersion from the optical power spectrum of the nonlinear signal measured for each of the applied spectral phases, and from the optical power spectrum of the pulse to be characterized;

calculating the temporal amplitude and phase of the pulse for optimum compression and for the applied dispersion range.

In one embodiment of the method, the optical power spectrum of the pulse to be characterized is measured from said pulse.

In another embodiment of the method, the calculation of the optical power spectrum of the pulse to be characterized is based on the calculation of the spectral phase of the pulse to be characterized and the applied dispersion.

In one embodiment of the method, the applied nonlinear optical process, and consequently the measured resulting signal, comprises a nonlinear effect that affects the optical power spectrum or the polarization of the pulse, in particular second-harmonic generation, sum-frequency generation, difference-frequency generation, transverse second-harmonic generation, transverse sum-frequency generation, transverse difference-frequency generation, the optical Kerr effect, self- and cross-phase modulation, cross-polarized wave generation, third- and higher-order harmonic generation, or combinations thereof.

In one embodiment of the method, calculating the spectral phase of the pulse to be characterized and the applied dispersion includes calculating a numerical iterative algorithm for iteratively approximating the spectral phase of the pulse to be characterized and the applied dispersion.

In another embodiment of the method, the numerical iterative algorithm comprises minimizing an error function defined between the measured spectrum of the pulse to be characterized and a calculated spectrum of the pulse to be characterized, by iterative approximations of the spectral phase of the pulse to be characterized and the applied dispersion.

Yet in another embodiment of the method, the numerical iterative algorithm comprises minimizing an error function defined between the measured spectrum of the nonlinear signal and the calculated spectrum of the nonlinear signal, by iterative approximations of the spectral phase of the pulse to be characterized and the applied dispersion.

In one embodiment of the method, the numerical iterative algorithm comprises minimizing an error function calculated:

using the property that the integral of the measured signal over dispersion for a given wavelength is independent of the phase of the pulse to be characterized; or locally, for each wavelength, with the overall error being a weighted function of all the local errors.

In one embodiment of the method, applying spectral phases so as to perform a scan along a dispersion range is performed between a lower limit and an upper limit of said range, continuously along said range or in a stepwise fashion along said range.

In one embodiment of the method, applying spectral phases so as to perform a scan is performed with the duration of the pulse to be characterized reaching a minimum during said scan.

In one embodiment of the method, applying spectral phases so as to perform a scan, applying said nonlinear optical process, and measuring said spectrum of the resulting signal is performed in parallel for a plurality of applied spectral phases.

Yet in another embodiment of the method, applying a numerical iterative algorithm comprises defining the functions of the spectral phase of the pulse to be characterized and the applied dispersion as discrete sampling functions, Taylor expansion functions, Fourier series functions or a combination thereof.

In one embodiment of the method, the functions of the spectral phase of the pulse to be characterized and/or the applied dispersion are represented by the consecutive derivatives of said functions with respect to frequency.

In one embodiment of the method, it is performed a correction of a non-flat spectral detection response by:

simulating a trace for the approximation of the pulse to be characterized and the applied dispersion at the current iteration;

comparing the simulated scan marginal to the measured scan marginal in order to calculate the spectral response to be compensated such that the numerical integral of the trace over the dispersion scan parameter, i.e. the frequency marginal, does not depend on the original spectral phase of the pulse to be characterized; and compensating for the calculated spectral response either by dividing the experimental trace by it or by including it in the retrieval process, by multiplying it by the ideal simulated trace, in each iteration.

In one embodiment of the method, compensation of a non-flat spectral detection response is performed by minimizing the error function for each wavelength, with the overall error being a weighted function of all these errors.

In one embodiment of the method, the simulated second-harmonic generation and sum-frequency generation (SHG/SFG) signal is calculated by:

applying an inverse Fourier transform to the complex spectrum (amplitude and phase) of the pulse to be characterized in order to obtain the corresponding electric field in the time domain;

squaring the time-dependent electric field so as to perform the SHG/SFG calculation; and applying a Fourier transform to obtain the SHG/SFG spectrum.

In one embodiment of the method, for the SHG/SFG calculation the spectrum is multiplied by an adequate spectral filter.

The present application also describes a system for characterizing laser pulses comprising:

a dispersive system or pulse compressor to apply known or unknown amounts of dispersion to the pulse so as to scan a dispersion range;

a nonlinear optical element for applying a nonlinear optical process to the pulse;

a sensor for measuring the amplitude spectrum of the resulting nonlinear signal for each of the applied spectral phases;

an electronic data processor configured to calculate the spectral phase of the pulse to be characterized and the applied dispersion, from the measured amplitude spectrum, for each of the applied spectral phases, and from the linear spectrum of the pulse to be characterized.

In one embodiment of the system, it also comprises a sensor for measuring the linear spectrum of the pulse to be characterized.

In one embodiment of the system, it also comprises as a source of spectral phases a dispersive optical system comprising mirrors, bulk optical materials, wedges, prisms, diffraction gratings, grisms, variable pressure gas cells, optical modulators such as acousto-optic, electro-optic or liquid crystal based devices, or a combination thereof.

In one embodiment of the system, the pulse compressor phase shifter is a laser pulse compressor.

In one embodiment of the system, the laser compressor comprises chirped mirrors, prisms, diffraction gratings, glass wedges, bulk optical materials, acousto-optic programmable dispersive filters, or a combination thereof.

In one embodiment of the system, the sensor comprises a spectrometer or a sensor based on CCD linear arrays or cameras, or a sensor based on CMOS linear arrays or cameras.

In one embodiment of the system, the nonlinear optical element comprises nonlinear optical crystals, gases, solids, liquids or plasmas, and the nonlinear process comprises second-harmonic generation, sum-frequency generation, difference-frequency generation, transverse second-harmonic generation, transverse sum-frequency generation, transverse difference-frequency generation, the optical Kerr effect and related nonlinear phase modulation effects, and/or third-harmonic generation or a combination thereof.

In one embodiment of the system, it also comprises means to execute in parallel said impartment of known or unknown spectral phases, nonlinear conversion and measurement of the resulting signal.

GENERAL DESCRIPTION

The present application generally relates to laser systems and laser pulse characterization methods. It is described a flexible self-calibrating dispersion-scan technique and device to characterize and compress ultrashort laser pulses over a broad range of pulse parameters, where previous knowledge of the amount of dispersion introduced for each position or step of the compressor is not required. The optimization algorithm is capable of retrieving not only the ultrashort pulse, but also to calibrate the dispersion introduced during the scan, which is an important property with great practical advantage concerning to the state of the art. As a consequence, d-scan measurements can be performed with virtually any dispersion scanning system, provided that the functional dependence of the introduced dispersion is known or modeled, e.g., as a Taylor expansion of the phase up to terms of arbitrary order. This means that non-calibrated internal pulse compressors in CPA laser systems can be used to directly measure their output pulses, which enables extending the d-scan technique to longer, narrower bandwidth laser pulses, with durations from tens of femtoseconds up to several picoseconds and more, as delivered by many types of CPA and optical parametric CPA (OPCPA) laser systems, while maintaining the distinctive advantages of the technique. The self-calibrating d-scan operation disclosed here is based on the numerical retrieval of the spectral phase of the pulses using an optimization algorithm, where the spectral phase is treated as a multi-parameter unknown variable, and where the unknown dispersion of the dispersion scanning system (e.g., a pulse compressor comprising mirrors, wedges, prisms, gratings, grisms, etc.) is described by a theoretical model of its functional dependence on the compressor position or step. The fundamental spectrum of the pulse can be measured directly or retrieved from the measured d-scan trace. During numerical optimization, the d-scan trace is initially simulated for a random guess phase and then the phase is iteratively modified until the simulated d-scan trace converges to the experimental one using a merit function based on the comparison between both traces. In a d-scan measurement there is no need to calibrate the intensity of the SHG signal, since it is possible to use the dispersion marginal of the trace or a generalized wavelength-dependent error function. After convergence, the optimization algorithm developed retrieves not only the spectral phase of the pulse (which allows its temporal characterization), but also the unknown phase introduced by the compressor during the scan. Each point of this frequency-dependent phase can be treated as an independent variable (point-by-point approach), or the phase can be described using an expansion, such as a Fourier series, or more commonly a Taylor series truncated to a desired arbitrary order. In the case of the Taylor series representation, the d-scan trace is not affected by the constant and linear phase terms, so these are not considered. Therefore, and for many relevant situations, it is possible to model the dispersion introduced per step as the combination of two unknown parameters: the group delay dispersion (GDD) and the third-order dispersion (TOD). If necessary, more terms can be added (fourth-order dispersion, and so on).

It is disclosed a method for characterizing the spectral phase of a laser pulse, the method comprising:
  applying spectral phases to the pulse by applying known or unknown amounts of dispersion so as to scan a dispersion range;
  applying a nonlinear optical process to the pulse;
  for each of the applied spectral phases, measuring the amplitude spectrum of the nonlinear signal resulting from the preceding step;
  calculating the spectral phase of the pulse to be characterized and the applied dispersion from the amplitude spectrum of the nonlinear signal measured for each of the applied spectral phases, and from the linear spectrum of the pulse to be characterized;
  calculating the temporal amplitude and phase of the pulse for optimum compression and for the applied dispersion range.

A range comprises the value variation between a lower limit and an upper limit of said values. For example, a dispersion range comprises the dispersion values between a lower limit and an upper limit of dispersion. The lower may be included or excluded in such range. The upper limit may also be included or excluded in such range. In particular, a stepwise range may only include the lower and upper limit value points. An embodiment of the method comprises applying different spectral phases to the pulse to be measured using a dispersive optical system comprising mirrors, wedges, prisms, gratings, grisms, linear and nonlinear optical materials, or combinations thereof, with known or unknown dispersion; applying a nonlinear process to the pulse to be characterized; measuring the resulting signal from the application of the different spectral phases and nonlinear process; such process being done as a scanning procedure or in parallel utilizing a single laser shot or an average of several laser shots; applying a numerical optimization algorithm to the measured signal to simultaneously retrieve the spectral phase of the pulse to be characterized and the dispersion of the dispersive optical system; calculating the temporal amplitude and phase of the pulse by applying an inverse Fourier transform to the pulse spectrum and the retrieved spectral phase. In an embodiment, applying different spectral phases to the pulse to be measured using a pulse compressor, with known or unknown dispersion; applying a nonlinear process to the pulse to be characterized; measuring the resulting signal from the application of the different spectral phases and nonlinear process; applying a numerical optimization algorithm to the measured signal to simultaneously retrieve the spectral phase of the pulse to be characterized and the dispersion of the compressor; calculating the temporal amplitude and phase of the pulse for optimum compression and for each applied dispersion step by applying an inverse Fourier transform to the pulse spectrum and the retrieved spectral phase; adjusting the compressor to obtain a desired pulse shape and duration. In an embodiment, the linear spectrum of the pulse to be characterized is measured from said pulse. In an embodiment, calculating the linear spectrum of the pulse to be characterized with the calculation of the spectral phase of the pulse to be characterized and the applied dispersion. In an embodiment, the applied nonlinear optical process, and consequently the measured resulting signal, comprises a nonlinear effect that affects the fundamental spectrum and/or the polarization of the pulse, in particular second-harmonic generation, sum-frequency generation, difference-frequency generation, the optical Kerr effect, self- and cross-phase modulation, cross-polarized wave generation, third- and higher-order harmonic generation, or combinations thereof.

In an embodiment, calculating the spectral phase of the pulse to be characterized and the applied dispersion includes calculating a numerical iterative algorithm for iteratively approximating the spectral phase of the pulse to be characterized and the applied dispersion.

In an embodiment, the numerical iterative algorithm comprises minimizing an error function defined between the measured linear spectrum of the pulse to be characterized and a calculated linear spectrum of the pulse to be characterized, by an iterative approximation of the spectral phase of the pulse to be characterized and the applied dispersion. In an embodiment, the numerical iterative algorithm comprises minimizing an error function calculated:
  using the property that the integral of the measured signal over dispersion for a given wavelength is independent of the phase of the pulse to be characterized; or
  locally, for each wavelength, with the overall error being a weighted function of all the local errors.

In an embodiment, applying spectral phases so as to perform a scan along a range is performed between a lower limit and an upper limit of said range, continuously along said range or in a stepwise fashion along said range. In an embodiment, applying spectral phases so as to perform a scan is performed with the duration of the pulses to be characterized reaching a minimum during said scan. In an embodiment, applying spectral phases so as to perform a scan, applying said nonlinear optical process, and measuring said amplitude spectrum of the resulting signal, are performed in parallel for a plurality of applied spectral phases. In an embodiment, applying a numerical iterative algorithm comprises defining the function of the spectral phase of the pulse to be characterized as a discrete sampling function, a Taylor expansion function, or a Fourier series function. In an embodiment, the function of the spectral phase of the pulse to be characterized is represented by the consecutive derivatives of said function with respect to frequency. An embodiment comprises correcting for a non-flat spectral detection response by:
  simulating a trace for the approximation of the pulse to be characterized and the applied dispersion at the current iteration;
  comparing the simulated scan marginal to the measured scan marginal in order to calculate the spectral response to be compensated such that the numerical integral of the trace over the dispersion scan parameter, i.e. the frequency marginal, does not depend on the original spectral phase of the pulse to be characterized and the applied dispersion; and
  compensating for the calculated spectral response either by dividing the experimental trace by it or by including it in the retrieval process, by multiplying it by the ideal simulated trace, in each iteration.

An embodiment comprises compensating for a non-flat spectral detection response by minimizing the error function for each wavelength, with the overall error being a weighted function of all these errors. In an embodiment, the measured second-harmonic generation and sum-frequency generation, SHG/SFG, signal is calculated by:
  applying an inverse Fourier transform to the spectrum of the pulse to be characterized in order to obtain the corresponding electric field in the time domain;
  squaring the time-dependent electric field so as to perform the SHG/SFG calculation; and
  applying an inverse Fourier transform to obtain the SHG/SFG spectrum.

In an embodiment, for the SHG/SFG calculation the spectrum is multiplied by an adequate spectral filter. It is also disclosed a system for characterizing laser pulses comprising:
  a pulse compressor or dispersive optical system for applying varying spectral phases to the pulse by applying known or unknown amounts of dispersion to the pulse so as to scan a dispersion range;
  a nonlinear optical element for applying a nonlinear optical process to the dispersed pulse;
  a sensor for measuring the amplitude spectrum of the resulting nonlinear signal for each of the applied spectral phases;
  an electronic data processor configured to calculate the spectral phase of the pulse to be characterized and the applied dispersion, from the amplitude spectrum of the nonlinear signal measured for each of the applied spectral phases, and from the linear spectrum of the pulse to be characterized.

An embodiment comprises a sensor for measuring the linear spectrum of the pulse to be characterized. An embodiment comprises as a source of varying spectral phases a dispersive optical system comprising mirrors, bulk optical materials, wedges, prisms, diffraction gratings, grisms, variable pressure gas cells, optical modulators such as acousto-optic, electro-optic or liquid crystal based devices, or a combination thereof. In an embodiment, the source of varying spectral phases is a laser pulse compressor. In an embodiment, the laser pulse compressor comprises chirped mirrors and glass wedges. In an embodiment, the laser pulse compressor comprises chirped mirrors, prisms, diffraction gratings, bulk optical materials, acousto-optic programmable dispersive filters, or a combination thereof. In an embodiment, the sensor comprises a spectrometer or a sensor based on CCD linear arrays or cameras, or a sensor based on CMOS linear arrays or cameras. In an embodiment, the nonlinear optical element comprises nonlinear optical crystals, gases, solids, liquids or plasmas, and the nonlinear process comprises second-harmonic generation, sum-frequency generation, difference-frequency generation, transverse second-harmonic generation, transverse sum-frequency generation, transverse difference-frequency generation, the optical Kerr effect and related nonlinear phase modulation effects, cross-polarized wave generation, and/or third- and higher-order harmonic generation or a combination thereof. An embodiment comprises means to execute in parallel said impartment of spectral phases, nonlinear conversion and measurement of the resulting signal.

BRIEF DESCRIPTION OF DRAWINGS

For easier understanding of this application, figures are attached in the annex that represent the preferred forms of implementation which nevertheless are not intended to limit the technique disclosed herein.

FIG. 1(a) GDD/L and (b) TOD/L in the simulated and retrieved d-scans. Filled circles: simulated values; hollow triangles: retrieved values.

FIG. 2(a) Theoretical and (b) retrieved self-calibrating d-scan traces for GDD/L=250 fs2/mm and TOD/L=1000 fs3/mm. Results of simulation with different GDD and TOD given in FIG. 1; (c) pulse spectrum (solid black curve) and retrieved spectral phase (dashed light grey curve: mean; solid grey curve: upper-lower limits of the standard deviation); (d) temporal intensity (solid black curve: theoretical; dashed grey curve: mean) and retrieved temporal phase (dashed light grey curve: mean; solid grey curve: upper and lower limits of the standard deviation).

FIG. 3(a) Experimental and (b) retrieved d-scan trace using the self-calibrating d-scan algorithm with glass dispersion fitted up to 3rd order; (c) Spectral amplitude (black curve) and phase; (d) temporal amplitude and phase. In (c) and (d), using known BK7 dispersion: solid grey curve; using self-calibrating d-scan: for fit to orders 2-3 (light grey dashed curve), for fit to orders 2-4 (dark grey dashed curve).

DETAILED DESCRIPTION

Figure 5:
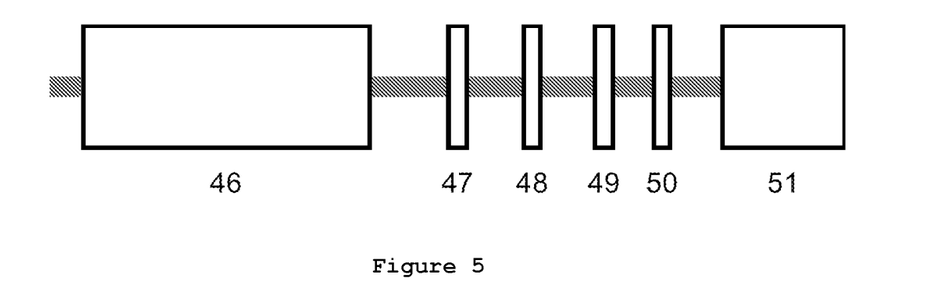
FIG. 5 illustrates a simplified diagram of possible experimental implementation, where the dispersion scan is performed sequentially, in a continuous or stepwise fashion, using a dispersive system or pulse compressor. The reference signs represent:
  46—pulse compressor or a dispersive optical system;
  47—focusing element;
  48—nonlinear element;
  49—optional collimating or refocusing element;
  50—filter;
  51—spectral analysis unit.
Figure 6:
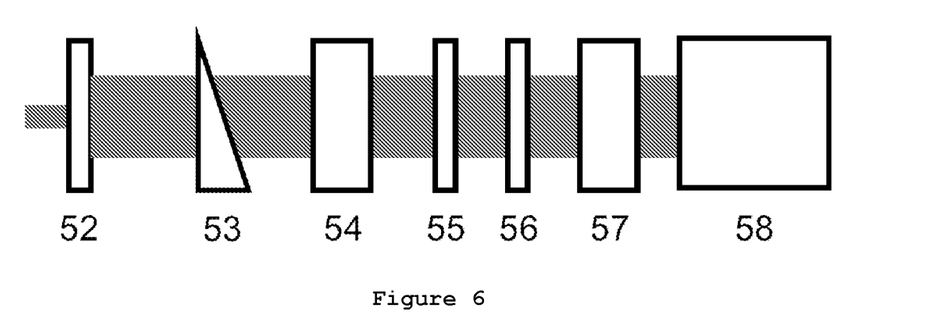
FIG. 6 illustrates a simplified diagram of a possible experimental implementation, where dispersion is encoded in one spatial dimension using a wedge or prism and the measurement of the whole trace can be done with a single laser shot. The reference signs represent:
  52—telescope;
  53—wedge or prism;
  54—imaging system;
  55—nonlinear medium;
  56—polarizer;
  57—imaging system;
  58—imaging spectrometer.
Figure 7:
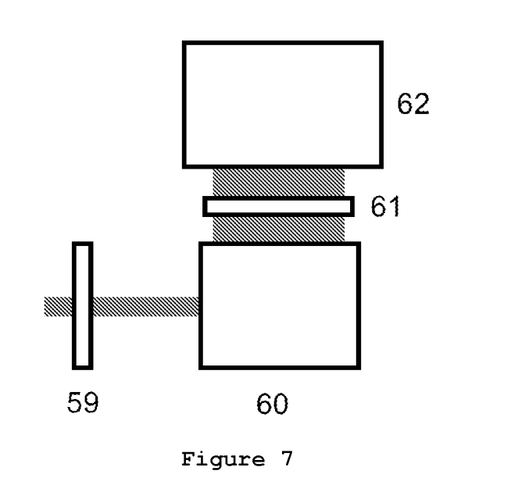
FIG. 7 illustrates a simplified diagram of a possible experimental implementation, where dispersion and nonlinear signal are simultaneously provided by a transverse second-harmonic generation crystal and the measurement of the whole trace can be done with a single laser shot. The reference signs represent:
  59—telescope or focusing system;
  60—nonlinear medium;
  61—band-pass filter and/or polarizer;
  62—imaging spectrometer.

Now, preferred embodiments of the present application will be described in detail with reference to the annexed drawings. However, they are not intended to limit the scope of this application. The present disclosure relates to a method and device for the simultaneous compression and characterization of ultrashort laser pulses, especially suited to measure ultrashort pulses with diverse bandwidths and durations. By frequency resolving the generated nonlinear signal for various amounts of dispersion one is able to determine the intensity and phase of the pulse as well as the dispersion of the compression or dispersive optical system through an adequate mathematical model and algorithm. This technique is related to the d-scan technique in the sense that the pulse to be measured suffers progressive dispersion and a nonlinear signal is measured as a function of this parameter. However, the present method distinguishes itself by providing several functionalities not present in the d-scan technique, namely by not requiring previous knowledge of the dispersion introduced by the pulse compressor or the dispersive optical system. This enables measuring the pulse using an arbitrary pulse compressor or dispersive optical system, such as the pulse compressor used in CPA and OPCPA systems. In an embodiment, a dispersion scan is performed in a continuous or stepwise fashion on the laser pulse using a pulse compressor or a dispersive optical system (46) with known or unknown dispersion, and for each dispersion the resulting pulse is focused with a focusing element (47), such as a lens of focusing mirror, in a nonlinear element (48), such as a second-harmonic crystal, where said pulse is frequency converted using a nonlinear process. An optional collimating or refocusing element (49) and optional filter (50), such as a band-pass filter and/or polarizer, can be used to collimate or refocus and to filter the nonlinear signal prior to detection with a spectral analysis unit (51), comprising a grating or prism-based spectrometer coupled to a CCD or CMOS sensor. In another embodiment, the transverse beam profile of the pulse can be expanded or reduced with an optional telescope (52) comprising lenses and/or mirrors, and a dispersion scan is encoded in one spatial dimension using a wedge or prism with known or unknown dispersion (53). The input face of (53) is reimaged with an imaging system (54), comprising lenses and/or mirrors, into a nonlinear medium (55), such as a second-harmonic crystal. The generated nonlinear signal can be filtered with an optional band-pass filter and/or polarizer (56) and reimaged with an imaging system (57) into an imaging spectrometer (58), where the measurement of the whole trace can be done with a single laser shot or by averaging over several laser shots. In another embodiment, the pulse crosses an optional telescope or focusing system (59) and is sent through a nonlinear medium (60) with known or unknown dispersion, such as a transverse second-harmonic generation crystal, for generating a transverse nonlinear signal. The generated transverse nonlinear signal is filtered with an optional band-pass filter and/or polarizer (61) and coupled into an imaging spectrometer (62), where the measurement of the whole trace can be done with a single laser shot or by averaging over several laser shots. It is first presented the self-calibrating d-scan method through numerical simulations assuming 28 fs pulses. Then it is demonstrated through experiments using glass wedges of known dispersion and 7 fs pulses and compare it to the standard d-scan technique. Finally, it is applied to the measurement of pulses with approximately 28 fs from a CPA laser system equipped with a prism compressor. It is calculated d-scan traces for simulated ultrashort pulses using the same spectral resolution for the SHG signal as in the CPA laser pulse measurements presented further below, and used a measured fundamental spectrum from the same system. Also, it is used 51 values of prism insertion, as for those experiments. The spectral phase imparted on the simulated initial pulse was a combination of GDD=200 $fs^2$, TOD=+

Figure 1:
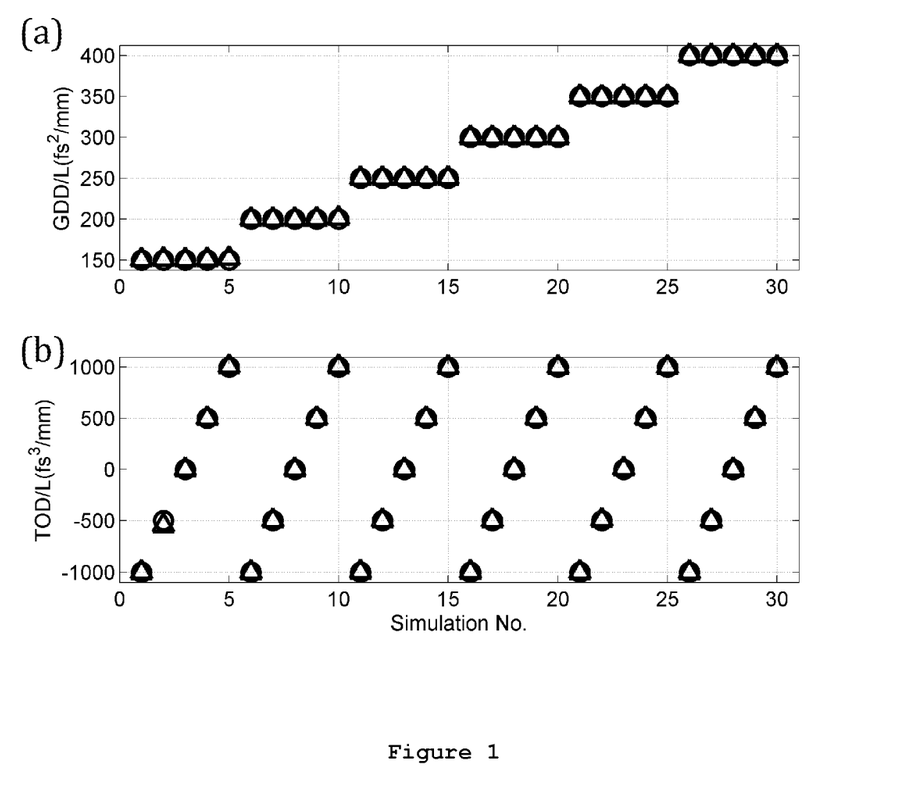
Figure 2:
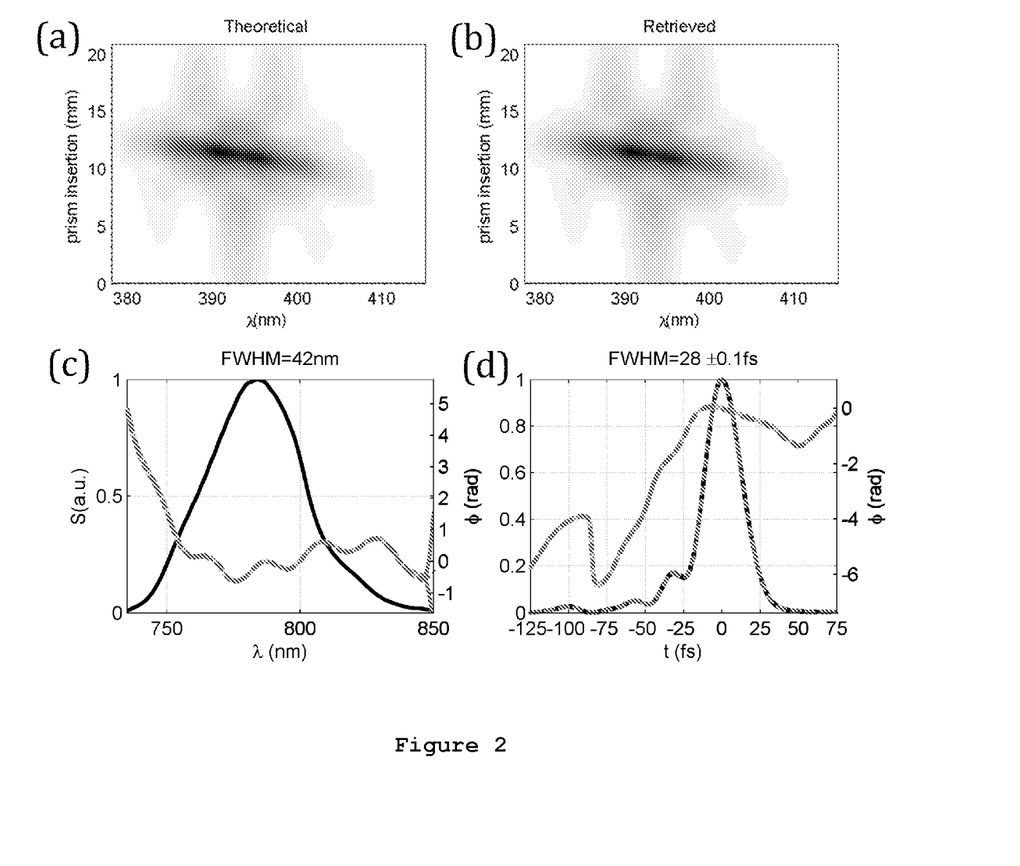
Figure 3:
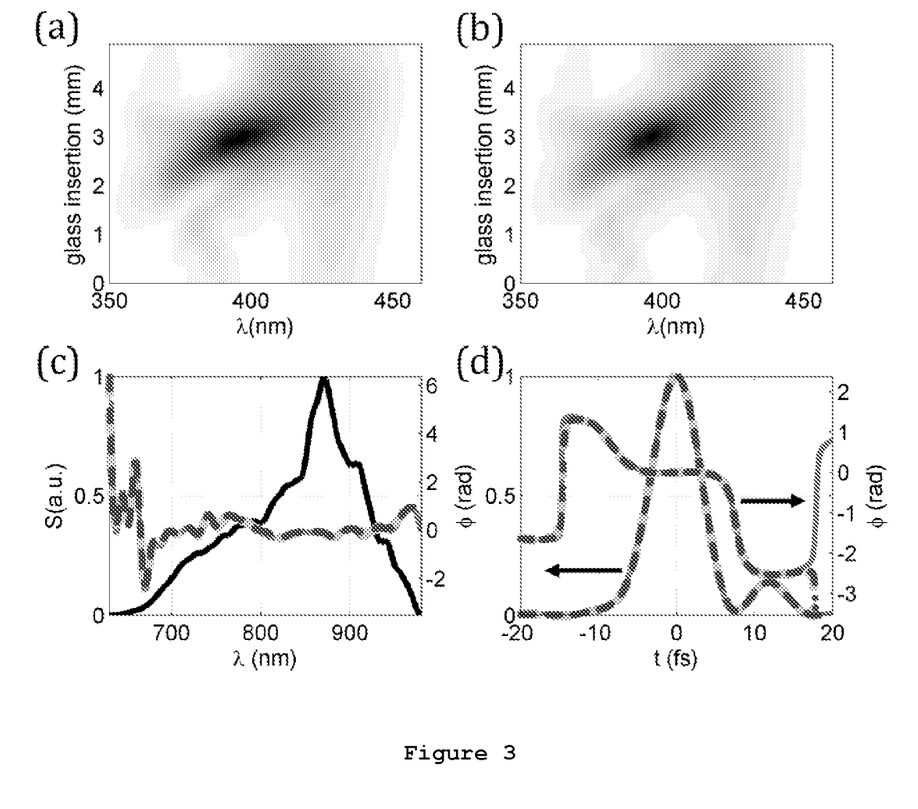
Figure 4:
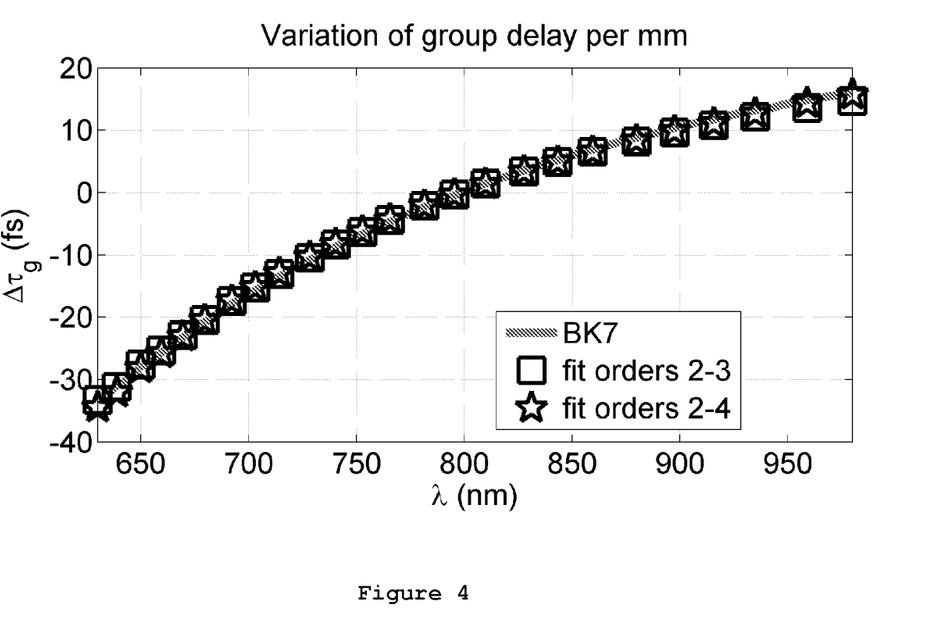
FIG. 4 illustrates the comparison of the variation of group delay per mm calculated for BK7 (solid grey curve) and obtained from self-calibrating d-scan using a dispersion fit to orders 2-3 (squares) and orders 2-4 (stars).

5000 fs$^3$, and an oscillatory term given by $0.25\{\cos[100(\omega-\omega_0)+\pi/10]\}$, where $\omega$ is the frequency and $\omega_0$ the central frequency of the laser pulse spectrum. These parameters result in a theoretical trace that is very representative of an actual system. In the simulations, it is used the following values of GDD/L and TOD/L (referring to prism dispersion per unit insertion length): GDD/L=150, 200, 250, 300, 350, and 400 fs$^2$/mm; TOD/L=−1000, −500, 0, 500, and 1000 fs$^3$/mm. Using always the same simulated pulse described before, for each combination of GDD/L and TOD/L it is calculated the simulated d-scan trace, which produced 30 simulations. One then used the self-calibrating retrieval, which gave the spectral phase as well as the GDD/L and TOD/L for each case. The initial guess pulse phase used in all the retrievals was flat (Fourier-transform-limited pulse) and the guess GDD/L and TOD/L were 250 fs$^2$/mm and 0 fs$^3$/mm, respectively. In FIG. 1, it is shown the comparison between the values used in the simulation and the values obtained with the self-calibrating d-scan algorithm. The agreement demonstrates that it is possible to apply this scheme to experiments with unknown dispersion at least up to the 3rd order. As an example, it is shown in FIG. 2(*a*) the theoretical d-scan trace created to test the numerical retrieval for simulation number 15 (GDD/L=250 fs$^2$/mm and TOD/L=1000 fs$^3$/mm). The self-calibrating d-scan trace retrieved by the optimization algorithm is plotted in FIG. 2(*b*) to illustrate the achieved convergence and agreement. The capability of the proposed scheme to accurately retrieve the unknown pulse is now analyzed. The calculated spectral phase, FIG. 2(*d*), matches the theoretical one, FIG. 2(*c*), and the deviations between the theoretical and the retrieved pulses are very small and cannot be appreciated, both in the spectral and in the temporal domains, as seen in FIG. 2(*d*). The obtained full-width-at-half-maximum (FWHM) pulse duration is 28.0±0.1 fs, in excellent agreement with the theoretical pulse duration (FIG. 2*d*). In the first demonstration experiment, it is used a Ti:Sapphire ultrafast laser oscillator with a central wavelength around 800 nm and a Fourier limit of approximately 7 fs, including chirped mirrors and glass wedges to compress the pulse and perform the d-scan. The d-scan trace was measured by recording the SHG spectra generated by the output beam focused on a nonlinear crystal as a function of the dispersion introduced by fixed insertion steps of BK7 glass wedges (8° angle), so the latter can be calculated from Sellmeier equations. This allows to compare the results from a standard d-scan algorithm (known dispersion) with the present self-calibrating d-scan, where one have modeled the dispersion of BK7 by fitting to orders 2-3 (GDD and TOD) and orders 2-4 (up to fourth-order dispersion). The results for the pulse retrieval are shown in FIG. 3, where the experimental trace in FIG. 3(*a*) is compared with the d-scan trace for self-calibrating d-scan shown in FIG. 3(*b*). For the three results shown (known dispersion, fit to orders 2-3, fit to orders 2-4), the calculated spectral phases show a very good agreement (FIG. 3(*c*)) as well as the corresponding temporal intensity and phase (FIG. 3(*d*)). The retrieved pulse durations are, respectively, 7.37, 7.32 and 7.31 fs (FWHM). To complete the first experimental demonstration of the validity of the self-calibrating method, it is shown the agreement of the calibration of the dispersion obtained by the algorithm with the values for BK7 calculated from Sellmeier equations (FIG. 4). As mentioned previously, the linear phase term is irrelevant here, so one calculated the variation of the group delay per mm, $\tau_g$, referred to the central wavelength of 800 nm. As noted previously, the self-calibrating d-scan technique can be applied to any CPA or OPCPA laser system, by using their standard internal (and in most cases uncalibrated) compressor as the dispersion scanning module. Therefore, the laser system can be used to perform a self-diagnostic, where both the output pulses and the compressor calibration can be obtained. As another experimental example, it is applied the technique to a CPA Ti:Sapphire laser system, comprising a double-pass compressor with two Brewster-angled prism pairs, delivering pulses with a Fourier-transform limit of 22 fs (FWHM) at a repetition rate of 1 kHz and centered at approximately 785 nm. The dispersion is scanned by varying the prism insertion in the beam path. The Brewster-angled prisms are made of LaKN16 glass, have an apex angle of approximately 60°, are separated by approximately 2 m and aligned for minimum deviation. After the prism compressor, the laser output is focused by an off-axis parabola (OAP) onto a nonlinear crystal. The SHG signal is filtered with high-pass optical filters and acquired with a fiber-coupled spectrometer. Additionally, we record the spectrum of the fundamental pulse with a second spectrometer. For the d-scan, we vary the prism insertion along a range of 20 mm with a linear stage in steps of 0.4 mm; less (more) prism insertion means more (less) negative chirp. This way we produce a complete d-scan trace, in which we track the SHG signal from negatively to positively chirped pulses, going through optimum compression. D-scan traces are taken for 51 values of the prism insertion. The SHG was optimized using the criterion of maximum signal and we verified that it was spatially homogeneous by laterally translating the collection fiber of the spectrometer. Under these conditions, one took five experimental d-scan traces for which the spectral phase, GDD/L and TOD/L were all retrieved in the manner explained previously. The experimental and retrieved d-scan traces are shown in FIGS. 8(*a*) and 8(*b*), respectively, for one of the experimental measurements. The statistics of the compressor dispersion calculated from the optimization are GDD/L=277.5±2.5 fs$^2$/mm and TOD/L=175±15 fs$^3$/mm, which means that both parameters are obtained with reasonable precision. In FIG. 8(*c*), it is shown the measured spectrum and the retrieved spectral phase, including its standard deviation. Like in the simulations presented before, the deviation is small enough and only becomes significant at the spectral edges, as expected, so it does not affect the temporal pulse intensity. The spectral phase is given for the prism insertion that corresponds to the shortest pulse duration and presents a remaining TOD (quite common for a prism compressor), which produces pre-pulses in the temporal domain, as seen in FIG. 8(*d*). The optimum pulse duration is 27.5±0.2 fs (FWHM). In conclusion, the self-calibrating dispersion-scan disclosed here allows measuring ultrashort pulses without previous knowledge of the dispersion introduced in the scan since only the functional dependence of the dispersion introduced in each step has to be known or modeled. The retrieval algorithm calculates both the unknown spectral phase and the dispersion of the used variable dispersion system (e.g., pulse compressor or stretcher, acousto-optic device, or any dispersive material), as shown through simulations and experimentally demonstrated by performing d-scan measurements with glass wedges of known dispersion for pulses with approximately 7 fs in duration. The disclosed technique was also applied to the measurement of amplified pulses from a prism-compressed CPA laser system by directly controlling the prism pair insertion to obtain the scan in dispersion. Together with the pulse characterization, the self-calibrating d-scan method simultaneously calibrated the dispersion of the pulse compressor and optimized the compression to find the shortest pulse duration generated from the system, in this case 27.5±0.2 fs (FWHM). These results demonstrate that the d-scan technique can be extended to any ultrashort pulse duration range and applied to any CPA or OPCPA system, as well as to any laser system coupled to a compressor. Such systems can therefore be self-diagnosed with the help of only a nonlinear crystal and a spectrometer. The self-calibrating d-scan also allows performing in-situ diagnostics just by placing a nonlinear medium at the target location and measuring the d-scan trace at that point. The term "comprising" whenever used in this document is intended to indicate the presence of stated features, integers, steps, components, but not to preclude the presence or addition of one or more other features, integers, steps, components or groups thereof. Flow or optical diagrams of particular embodiments of the presently disclosed methods are depicted in figures. The diagrams do not depict any particular means, rather the diagrams illustrate the functional information one of ordinary skill in the art requires to perform said methods required in accordance with the present disclosure. It will be appreciated by those of ordinary skill in the art that unless otherwise indicated herein, the particular sequence of steps described is illustrative only and can be varied without departing from the disclosure. Thus, unless otherwise stated, the steps described are so unordered meaning that, when possible, the steps can be performed in any convenient or desirable order such that the same result is achieved. The disclosure should not be seen in any way restricted to the embodiments described and a person with ordinary skill in the art will foresee many possibilities to modifications thereof. The above described embodiments are combinable.

The invention claimed is:

1. A method for characterizing the spectral phase of a laser pulse, comprising the following steps:
    applying spectral phases to the laser pulse by applying unknown amounts of dispersion, the unknown amounts of dispersion defined by a theoretical model of functional dependence on a dispersion scanning system position or step, so as to scan a dispersion range between a lower limit and an upper limit of said dispersion range, continuously along or in a stepwise manner along said range;
    for each of the applied spectral phases, applying a nonlinear optical process to the laser pulse and obtaining nonlinear signals;
    measuring an optical power spectrum of the obtained nonlinear signals resulting from the previous step, and obtaining a measured d-scan trace;
    calculating an iterative numerical algorithm comprising the steps of:
        defining functions of the spectral phase of the laser pulse and the unknown applied dispersion as discrete sampling functions, consecutive derivatives with respect to frequency, Taylor expansion functions, Fourier series functions or a combination thereof,
        initially stimulating a d-scan trace from a random guess phase for the functions of the spectral phase of the laser pulse and the unknown applied amounts of dispersion defined in the previous step by calculating the optical power spectrum of the nonlinear signal of the laser pulse from the optical power spectrum and the initial guess spectral phase of the laser pulse;
        for each unknown amount of applied dispersion of the dispersion scanning system;
        calculating the spectral phase of the laser pulse and the unknown applied dispersion from the measured d-scan trace and the simulated d-scan trace by iteratively approximating the spectral phase of the laser pulse and the unknown applied dispersion, comprising minimizing an error function defined between the measured d-scan trace and the simulated d-scan trace;
    calculating a temporal amplitude and temporal phase of the laser pulse for optimum compression and for the applied dispersion range by applying an inverse Fourier transform to the optical power spectrum and the retrieved spectral phase, adjusting the dispersion scanning system position or step to obtain a desired temporal pulse shape and duration.

2. The method according to claim 1, wherein the optical power spectrum of the laser pulse is measured from said pulse.

3. The method according to claim 1, comprising calculating the optical power spectrum of the laser pulse with the calculation of the spectral phase of the laser pulse and the unknown applied dispersion.

4. The method according to claim 1, wherein the applied nonlinear optical process, and consequently the measured resulting signal, comprises a nonlinear effect that affects the optical power spectrum or the polarization of the pulse selected from second-harmonic generation, sum-frequency generation, difference-frequency generation, transverse second-harmonic generation, transverse sum-frequency generation, transverse difference-frequency generation, the optical Kerr effect, self- and cross-phase modulation, cross-polarized wave generation, third- and higher-order harmonic generation, or combinations thereof.

5. The method according to claim 1, wherein the iterative numerical iterative algorithm comprises minimizing an error function calculated:
    using the a property that the an integral of the measured d-trace over dispersion for a given wavelength is independent of the spectral phase of the laser pulse; or
    locally, for each wavelength, with the overall error being a weighted function of all the local errors.

6. The method according to claim 1, wherein applying spectral phases so as to perform a scan, applying said nonlinear optical process, and measuring said spectrum of the resulting signal is performed in parallel for a plurality of applied spectral phases.

7. The method according to claim 1, comprising correcting for a non-flat spectral detection response by:
    simulating a d-scan trace for the approximation of the spectral phase of the laser pulse and the applied dispersion at a current iteration;
    calculating the integral of the measured d-scan trace over dispersion;
    comparing the integral of the simulated d-scan trace over dispersion to the integral of the measured d-scan trace over dispersion in order to calculate the spectral response to be compensated such that the numerical integral of the simulated d-scan trace does not depend on the original spectral phase of the laser pulse; and
    compensating for the calculated spectral response either by dividing the measured d-scan trace by it or by including it in the retrieval process, by multiplying it by the simulated d-scan trace, in each iteration.

8. The method according to claim 1, comprising compensating for a non-flat spectral detection response by minimizing a local the error function for each wavelength, with the overall error being a weighted function of all the local error functions.

9. The method according to claim 1, wherein a the simulated second-harmonic generation and sum-frequency generation (SHG/SFG) signal is calculated by:
- applying an inverse Fourier transform to the (amplitude of the optical power spectrum with the spectral laser pulse in order to obtain a time-dependent electric field of the laser pulse in a time domain;
- squaring the time-dependent electric field from the previous step so as to perform the SHG/SFG calculation; and
- applying a Fourier transform to the squared time-dependent electric field of the previous step to obtain the SHG/SFG spectrum.

10. The method according to claim 9, wherein for the SHG/SFG calculation the spectrum is multiplied by an adequate spectral filter.

11. A system used in the method for characterizing laser pulses according to claim 1, the system comprising:
- a dispersive system or laser pulse compressor configured to apply variable amounts of dispersion to the laser pulse so as to scan a dispersion range;
- a nonlinear optical element configured to apply the nonlinear optical process to the laser pulse, and obtaining the nonlinear signal;
- a sensor configured to measure the optical power spectrum of the nonlinear signal from the nonlinear optical element for each of the applied amounts of dispersion, and obtaining a measured d-scan trace; and
- an electronic data processor configured to apply the iterative numerical algorithm to the measured d-scan trace and to the optical power spectrum of the laser pulse, either measured or calculated from the measured d-scan trace, to calculate the spectral phase of the laser pulse and the variable applied dispersion, from the measured d-scan trace and from the optical power spectrum of the laser pulse.

12. The system according to claim 11, comprising a sensor configured to measure the optical power spectrum of the laser pulse.

13. The system according to claim 11, wherein the dispersive system or laser pulse compressor comprises mirrors, bulk optical materials, wedges, prisms, diffraction gratings, grisms, variable pressure gas cells, optical modulators such as acousto-optic, electro-optic or liquid crystal based devices, or a combination thereof.

14. The system according to claim 11, wherein the laser pulse compressor comprises chirped mirrors, prisms, diffraction gratings, glass wedges, bulk optical materials, acousto-optic programmable dispersive filter, or a combination thereof.

15. The system according to claim 11, wherein the sensor comprises a spectrometer or a sensor based on CCD linear arrays or cameras, or a sensor based on CMOS linear arrays or cameras.

16. The system according to claim 11, wherein the nonlinear optical element comprises nonlinear optical crystals, gases, solids, liquids or plasmas, and the nonlinear optical process comprises second-harmonic generation, sum-frequency generation, difference-frequency generation, transverse second-harmonic generation, transverse sum-frequency generation, transverse difference-frequency generation, the optical Kerr effect and related nonlinear phase modulation effects, and/or third-harmonic generation or a combination thereof.

17. The system according to claim 11 comprising means to execute in parallel the application of variable amounts of dispersion, nonlinear optical process and measurement of the resulting nonlinear signal.

\* \* \* \* \*